United States Patent [19]

Cornils et al.

[11] Patent Number: 5,723,196
[45] Date of Patent: Mar. 3, 1998

[54] AUTOMOBILE GLASS PANE ADAPTED FOR BONDING TO A WINDOW FRAME AND A METHOD FOR THE PRODUCTION THEREOF

[75] Inventors: Gerd Cornils, Merzenich; Rolf Kotte, Alsdorf-Bogan; Karl Heinrich Bruck, Wollsburg; Florian Fischer, Alsdorf; Ulrich von Alfen; Hans Ohlenforst, both of Aschen, all of Germany

[73] Assignee: Saint Gobain Vitrage International, Courbevoie, France

[21] Appl. No.: 188,161

[22] Filed: Jan. 18, 1994

[30] Foreign Application Priority Data

Jan. 16, 1993 [DE] Germany ............... 43 01 026.1
Feb. 3, 1993 [DE] Germany ............... 43 02 981.7
Apr. 8, 1993 [DE] Germany ............... 43 11 584.5

[51] Int. Cl.[6] ................................. B60J 10/02
[52] U.S. Cl. ............... 428/122; 49/495.1; 52/204.595; 428/358
[58] Field of Search .................. 428/122, 358, 428/14; 49/495.1; 52/204.595

[56] References Cited

U.S. PATENT DOCUMENTS 3,779,794  12/1973  DeSantis ................ 428/422.8
4,662,113  5/1987   Weaver .................. 49/404
4,712,826  12/1987  Omori ................... 52/208 X
4,762,481  8/1988   Weaver .................. 425/116
4,834,931  5/1989   Weaver .................. 264/252
4,938,521  7/1990   Kunert .................. 52/208
5,062,248  11/1991  Kunert .................. 428/122 X
5,069,012  12/1991  Riederer ................ 52/208
5,391,416  2/1995   Kunert .................. 428/122

FOREIGN PATENT DOCUMENTS

0 494 824 A1  7/1992   European Pat. Off. .
36 12 923 A1  10/1987  Germany .

Primary Examiner—Henry F. Epstein
Attorney, Agent, or Firm—Pennie & Edmonds LLP

[57] ABSTRACT

An automobile glass pane is provided with a frame molding of a polymer. The molding has a portion with a U-like cross section. In this portion, an adhesive bead is introduced, the bead serves for bonding the glass pane to the attachment flange of the window opening in the vehicle bodywork. The lateral limbs of the U-like portion of the molding are internally provided with anchoring projections for mechanically holding the adhesive bead in place between the limbs without any separate adhesive or bonding.

6 Claims, 6 Drawing Sheets

AUTOMOBILE GLASS PANE ADAPTED FOR BONDING TO A WINDOW FRAME AND A METHOD FOR THE PRODUCTION THEREOF

BACKGROUND OF THE INVENTION

The invention relates to a glass pane adapted for bonding to the attachment flange of a window opening and more especially an automobile glass pane. Prior constructions include a frame-like polymer molding, which is arranged in the edge part of the pane with a portion directed towards the attachment flange. This portion has a U-like cross section; and an adhesive bead is arranged in the portion of U-like cross section. The lateral limbs of the U-like portion internally have anchoring projections.

Such a specially adapted automobile glass pane is disclosed in U.S. Pat. No. 5,062,248. In the case of this known automobile glass pane the connection of the specially adapted glass pane with the attachment flange is basically performed using the adhesive joining effect of the bonding material with the frame-like polymer molding. The term molding is used herein in the sense of a strip with a specially contrived cross section manufactured for instance by extrusion or by injection molding. The anchoring projections in this case serve to further improve the adhesive joint between the bonding composition and the polymer molding, since in addition to the adhesion there is an interlocking mechanical anchoring effect between the molding frame and the bead of bonding material.

The frame-like polymer molding consists, in the case of this known automobile glass pane, of polyurethane and is produced either using a moisture curing single component polyurethane system or using a twin component reactive mixture by extrusion onto the glass pane. U.S. Pat. No. 5,062,248 further discloses systematic adjustment to get a low adhesive effect, or even suppressing such adhesive effect completely, between the polymer molding and the assembly bonding material with the result that the connection is only produced by the interlocking mechanical anchoring action. The prevention of an adhesive join is in this case ensured by the use of a release agent.

SUMMARY OF THE INVENTION

Taking this prior art as a starting point one object of the present invention is to provide a suitable combination of materials for the polymer molding and for the assembly bonding material which ensures that on the one hand an adhesive bonding effect between the material is certainly prevented without the interposition of a release agent and on the other hand the adhesive effect leads to high mechanical anchoring forces.

In order to achieve this object of the invention, the frame-like polymer molding comprises a thermoplastic polyolefin elastomer of isotactic polypropylene and ethylene-propylene-diene rubber and the bonding material comprises a moisture curing single component polyurethane system, which does not enter into any adhesive bond with the molding. The result is a connection between the polymer molding and the cured bonding material which is only due to the mechanical interlock.

Glass panes adapted in accordance with the invention may be readily installed without further preparation using the conventional bonding method by mounting the same with the bonding material, arranged in the cavity of the U-like portion, in the window frame. After curing of the bonding material, it is possible at any time for it to be removed by simply pressing it out of its seat. The lateral limbs of the U-like molding give way and become detached from the cured bead of bonding material. The removed glass pane may then be utilized again and replaced in position again without any difficulties. For this purpose merely the cured bonding material bead, which sticks to the attachment limb of the window frame, is removed from the attachment limb, and the glass pane, provided with a new mass of bonding material, is replaced in the window frame.

It is a particular advantage with this new type of attachment for glass panes and more particularly in the case of automobile glass panes that simple removal of the glass pane and the re-use thereof for the production of automobiles is possible. For example, re-spraying of the automobile bodywork may be necessary adjacent to the window frames. By the same token this new manner of attachment is an advantage at the end of the life of the vehicles, when the panes of glass have to be removed for recycling the same.

As a thermoplastic polyolefin elastomer composed of isotactic polypropylene and ethylene-propylene-diene rubber for the polymer molding use is preferably made of the product sold as SANTOPRENE A type 114-64 by the company Advanced Elastomer Systems. As the bonding material the BETASEAL compound of GURIT-ESSEX has been found to be particularly satisfactory. Using these two materials particularly satisfactory results are to be achieved owing to the mechanical properties of such two materials and owing to the anti-adhesive behavior of the two compounds with respect to one another.

BRIEF DESCRIPTION OF THE DRAWINGS

Working embodiments and further developments of the invention will be described in more detail with reference to the drawings, of which.

DETAILED DESCRIPTION OF THE INVENTION

Figure 1:
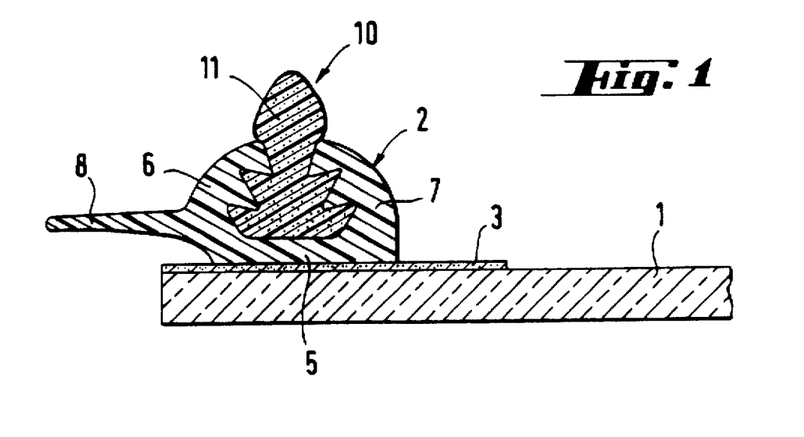
FIG. 1 is a cross-sectional view of an automobile glass pane adapted in accordance with the invention by the provision of a polymer molding bonded to one side of the pane.
Figure 2:
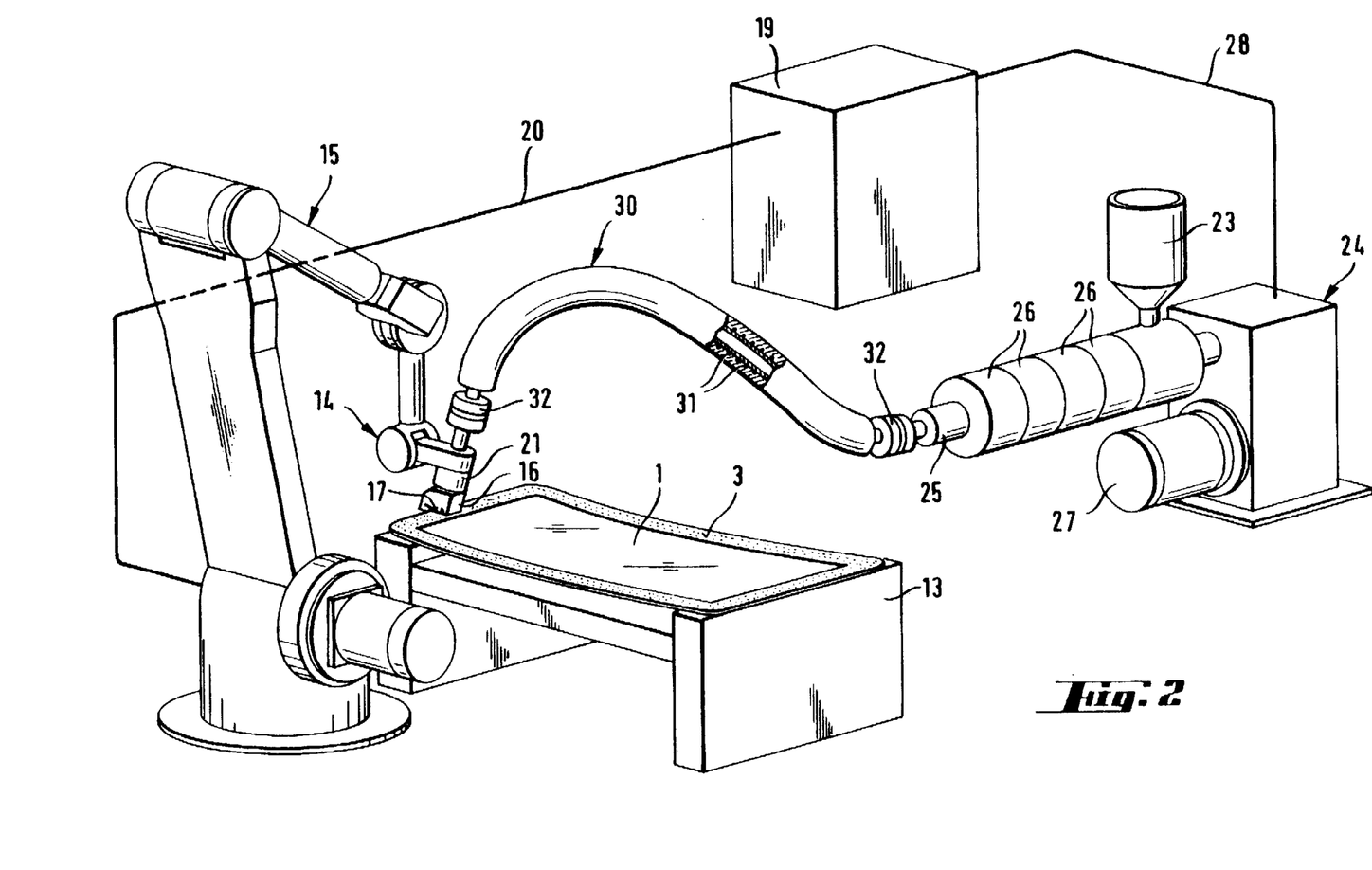
FIG. 2 is a cross-sectional view of an apparatus for the production of the adapted glass pane depicted in FIG. 1.

The pane of glass illustrated in FIG. 1, what is adapted for installation in a automobile window frame, is in the form of an automobile glass pane 1. With, which with the aid of an extrusion method the pane is provided on one side with a polymer frame 2. The production of this polymer frame 2 is performed with the aid of a device which is depicted in FIG. 2.

On the side facing the attachment flange of the window frame the pane 1 of glass is furnished with a frame-like layer 3 or coating of vitreous enamel. After treatment of the edge surface, which is provided with the layer 3, with a suitable primer the frame-like molding 2 is extruded onto the enamel layer. The molding 2 possesses a substantially U-like cross section and consists of the floor portion 5 and the two lateral limbs 6 and 7. Furthermore, the molding 2 is provided with a sealing and centering lip 8 projecting past the periphery of the pane.

The molding consists of a thermoplastic polyolefin elastomer composed of isotactic polypropylene and ethylene-propylene-diene rubber. For this purpose the product sold as SANTOPRENE by the company Advanced Elastomer Systems has turned out to be quite suitable. As a primer for the pre-treatment of the enamel layer 3 use is made of a modified two-component polyurethane system in a solvent, which consists of mixture of trichloroethylene, 1,1,1-trichloroethane and methylene chloride. For this purpose the products X8310 of the Henkel Company and AK920 of the Kömmerling Company have been found to be particularly suitable.

The two lateral limbs 6 and 7 are provided on the inside with projecting teeth. The cavity defined by the lateral limbs becomes wider in a downward direction and has a christmas tree-like cross section. This cavity is filled with the bonding material 10, as for example with the product BETASEAL of the GURIT-ESSEX Company, which does not react chemically with the material of the molding 2, that is to say it does not adhere thereto so that the connection is exclusively formed by the interlocking tooth configuration. The bonding material composition 10 is injected with the aid of an injection nozzle into the cavity in such a manner that it fills the same completely the furthermore forms a protruding excess structure 11 projecting past the molding 2 and which represents the actual supply of bonding material for assembly.

As shown in FIG. 2 in detail, the pane 1 of glass is exactly positioned on a table 13 for the application of the polymer frame 2. The pane 1 has been heated to a temperature of 70° to 90° C. An extrusion nozzle 16 is arranged on the manipulator head 14 of a robot 15, such nozzle having a nozzle aperture 17 designed with a predetermined size corresponding to the desired frame molding.

The extrusion nozzle 16 is run along the edge of the pane 1 in accordance with the preset displacement program by the robot 15, the robot 15 being controlled by a central control unit 19 through a control line 20. The extrusion nozzle 16 is provided with an electrical heating element 21, by means of which the nozzle body is heated to the temperature of approximately 200° C. necessary for such extrusion.

The thermoplastic elastomer to be extruded is introduced in the form of granules into the feed hopper 23 and melted in the helical extruder 24 and applied under high pressure to the extrusion nozzle 16. The cylinder 25 containing the worm of the helical extruder 24 is surrounded by a plurality of heating rings 26, which with the aid of electrical heating resistors heat the cylinder 25 including the worm rotating therein to the required temperature. The drive motor 27 of the helical extruder 24 is controlled via the control line 28 just like the robot 15 from the central control unit 19.

In order to provide a connection between the cylinder 25 of the extruder 24 and the extrusion nozzle 16 use is made of an electrically heated high pressure hose 30. The high pressure hose 30 has to resist pressures of at least 250 bar at the operating temperature and has an electrical heating winding 31, which renders possible a regulated heating of the hose 30 to a temperature of approximately 200° C. On the other hand it is necessary for the high pressure hose 30 to be so flexible that it is able to follow the motion of the extrusion nozzle without limitation and does not interfere with the movement of the robot.

The high pressure hose 30 does however, on the other hand, necessarily possess a certain degree of torsional stiffness, which may in some case interfere with the extrusion operation. For in the course of one revolution of the manipulator head 14 about the glass pane the extrusion nozzle is turned through 360° and this twisting movement is transmitted to the hose 30. Owing to the continual torsional loads, on the one hand, the hose 30 is affected, something which may lead to an acceleration of wear of the hose 30. On the other hand, due to such torsional strains the corresponding reactions forces are impressed on the manipulator head 14, something which may lead to inaccuracy during the extrusion operation. In order to avoid such effects it is consequently possible for one or more rotary tube joints 32 to be incorporated along the high pressure hose 30.

Figure 3:
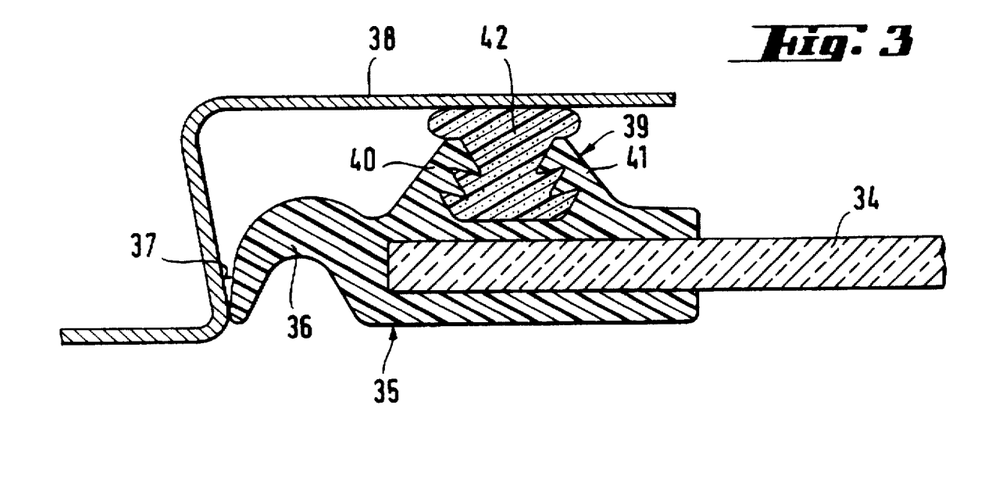
FIG. 3 is a cross-sectional view of an automobile glass pane adapted by the provision of a molding frame encircling the edge of the pane.

The pane 34, which in FIG. 3 is depicted in the installed state, is furnished with a polymer frame 35, which has been produced by injection molding. In this case the glass pane 34 is surrounded on either side by the molding frame. The molding frame 35 is provided with a projecting lip 36. The lip 36 rests against the wall surface 37 of the window frame and shuts off the gap existing between the pane of glass and this wall surface 37. On the other side facing the attachment limb 38 of the window frame the molding frame 35 is furnished with a portion 39 having a U-like cross section, whose lateral limbs 40 and 41 possess inner, projecting teeth. The cavity defined by the lateral limbs 40 and 41 is filled with the bonding material composition 42. For the bonding material composition 42 and the molding frame 35, the same materials are utilized as was described in conjunction with FIG. 1.

In FIGS. 4 through 7 two examples for the design of injection molds are represented, with which the invention may be put into practice with the aid of an injection molding process.

Figure 4:
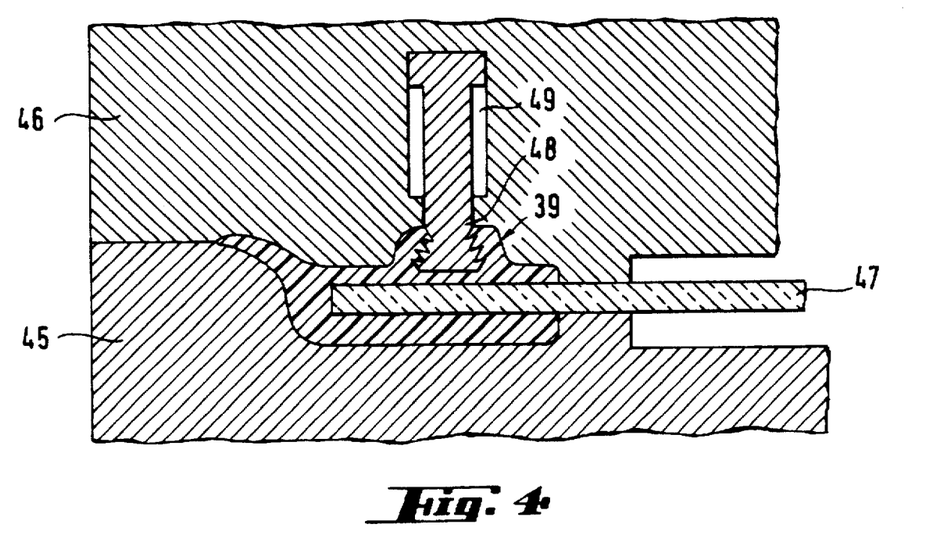
FIG. 4 is a cross-sectional view of an injection molding tool suitable for the production of a frame with material molded around it and having a moving core in the course of the injection mold operation.
Figure 5:
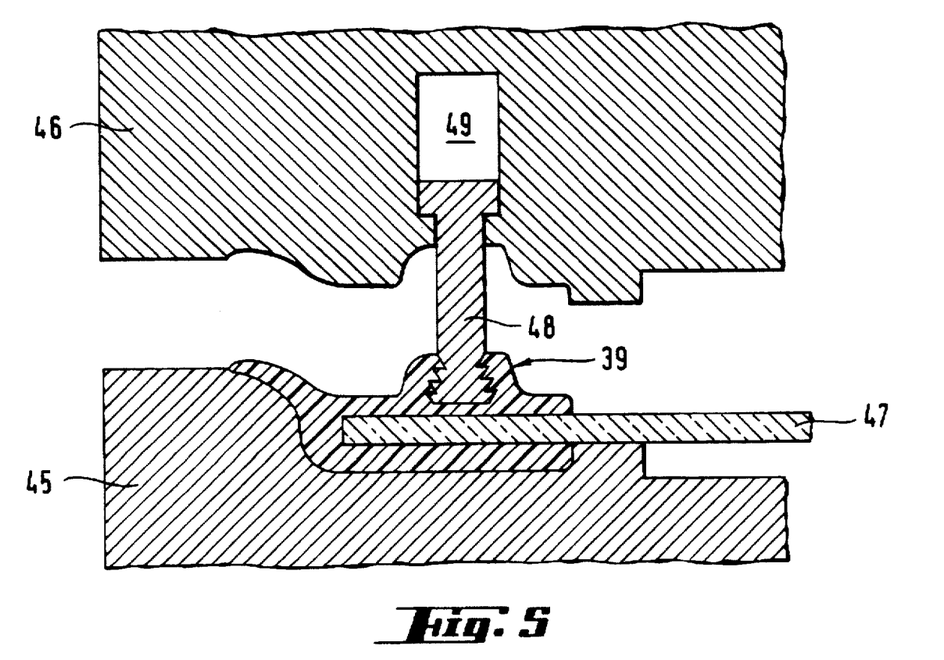
FIG. 5 is a cross-sectional view of the injection molding tool of FIG. 4 after separating the mold parts.

In this respect FIGS. 4 and 5 illustrate an injection mold with a lower mold 45 and an upper mold 46, which are provided with mold cavities corresponding to the desired cross section of the molding. The pane 47 of glass is introduced into this injection mold and the cavity is filled with the thermoplastic polymer under pressure. In order to form the cavity provided with the anchoring projections in the U-like portion 39, the upper mold 46 is furnished with a moving core 48. The core 48 is able to be moved within a cavity 49 in the upper mold between two terminal positions. During the injection molding operation the core 48 assumes the upper terminal position in the upper mold 46. The demolding operation after the solidification of the thermoplastic polymer takes place in two stages. In the first stage the upper mold 46 is lifted in order to free the molded polymer molding at the top. During this operation the core 48 will remain in the U-like portion 39 until the upper mold 46 has been lifted so far that the core 48 has reached its lower terminal position in the cavity 49. During further upward movement of the upper mold 46 the core 48 is entrained by the upper mold. It may now be removed from the portion 39 without any difficulty, because the two lateral limbs of the U-like portion are able to give way laterally, since on the one hand they are no longer held from the outside and on the other hand they consist of an elastically deformable material.

Figure 6:
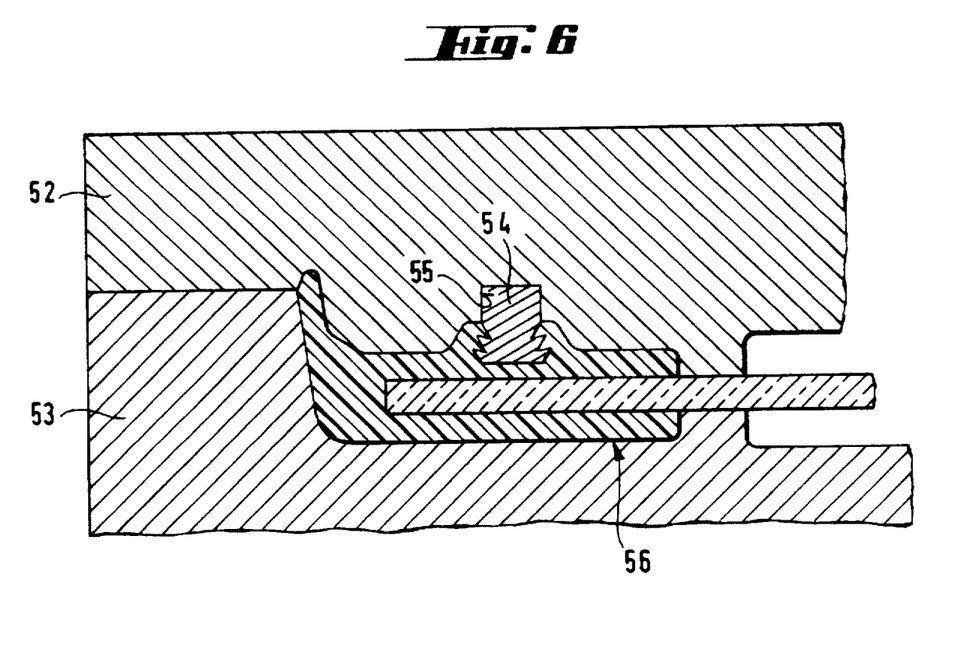
FIG. 6 is a cross-sectional view of an injection molding tool with a core able to be arranged loosely in the upper mold during the injection molding operation.
Figure 7:
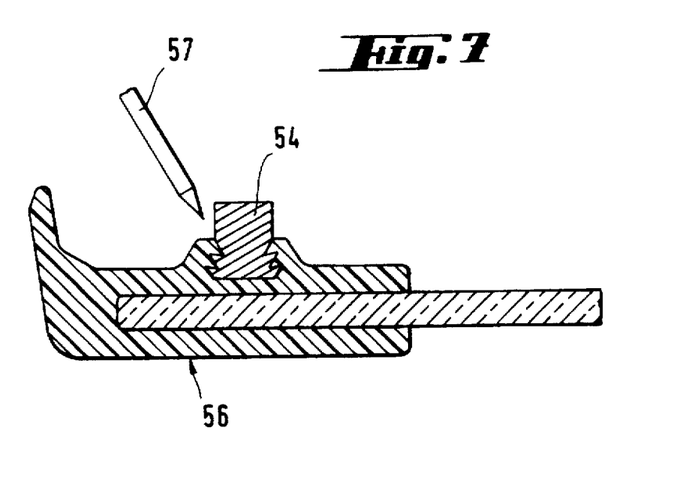
FIG. 7 is a cross-sectional view of the glass pane after removal from the injection molding tool illustrated in FIG. 6 prior to the removal of the core.

A further possibility for the design of an injection mold suitable for the purposes of the invention is illustrated in FIGS. 6 and 7. In this case as well the injection mold comprises an upper mold 52 and a lower mold 53 with mold cavities corresponding to the molding frame 56, and furthermore a core 54 for the formation of the molding portion possessing the anchoring projections. Said core 54 is however in this case independent of the upper mold 52. It is designed in the form of a separate ring and rests in a corresponding recess 55 in the upper mold 52. When demolding the pane of glass after the injection mold operation, the annular core 54 will remain in the polymer frame 56 as is illustrated in FIG. 7. It is convenient if the core ring 54 is left in the frame 56 until the latter is completely solidified. Then it may be detached from the molding frame 50 with the aid of a suitable tool 57.

The core ring can be in the form of a strong metallic ring, which may be used again. However it is also possible to employ a core ring of a cheap material, which is discarded once it has been used once.

The curing of the bonding material composition after introduction thereof into the U-like portion of the molding frame is performed by reaction with the moisture contained in the surrounding atmosphere. The bonding material composition is however, to a large extent, surrounded by the limbs of the U-like portion and has to this extent no contact with the surrounding atmosphere. Owing to this, the diffusion paths for the moisture contained in the surrounding atmosphere are relatively long and consequently for a complete cure of the bonding material a comparatively long time will be necessary. In many a case it may however be expedient for the cure of the bonding material to take place in a relatively short time so that the pane of glass may if necessary be removed a short time after being installed, for example for the purpose of making some alterations to the bodywork prior to delivery of the vehicle by the vehicle manufacturer.

In order to shorten the cure time in accordance with a convenient development of the invention, the surface of the U-like portion coming into contact with the bonding material composition of the frame-like molding may be provided at least partly with a coating containing moisture and/or hydroxyl ions.

The moisture required for the cure of the bonding material is in this case not only supplied via the surrounding air to the bonding material but the moisture necessary for the cure reaction is offered to the bonding material by the contact with the coating containing the moisture. It is in this fashion that the cure of the bonding material may be commenced directly after the application of the bonding material into the frame-like molding and for the cure time to be substantially shortened. It is possible as well to use a selection of the materials for the coating and of the thickness of the coating in order to introduce defined quantities of moisture into the bonding material so that the curing operation may be controlled in the desired, systematically fashion.

As materials for the coating for storing the moisture and releasing it to the bonding material, it is possible to utilize for instance high molecular weight substances containing water and/or hydroxyl groups such as carbohydrates or polyvinylalcohols. It has been found more especially suitable to utilize for instance methylcellulose or cellulose derivatives. The effect of water absorption and release may if necessary be influenced, and for example increased, by the addition of hydrophilic or hygroscopic salts in the desired fashion.

The coating of the frame-like molding with the substance absorbing moisture can be performed at any desired time. It is however convenient for it to take place following the extrusion of the frame-like polymer molding.

Figure 8:
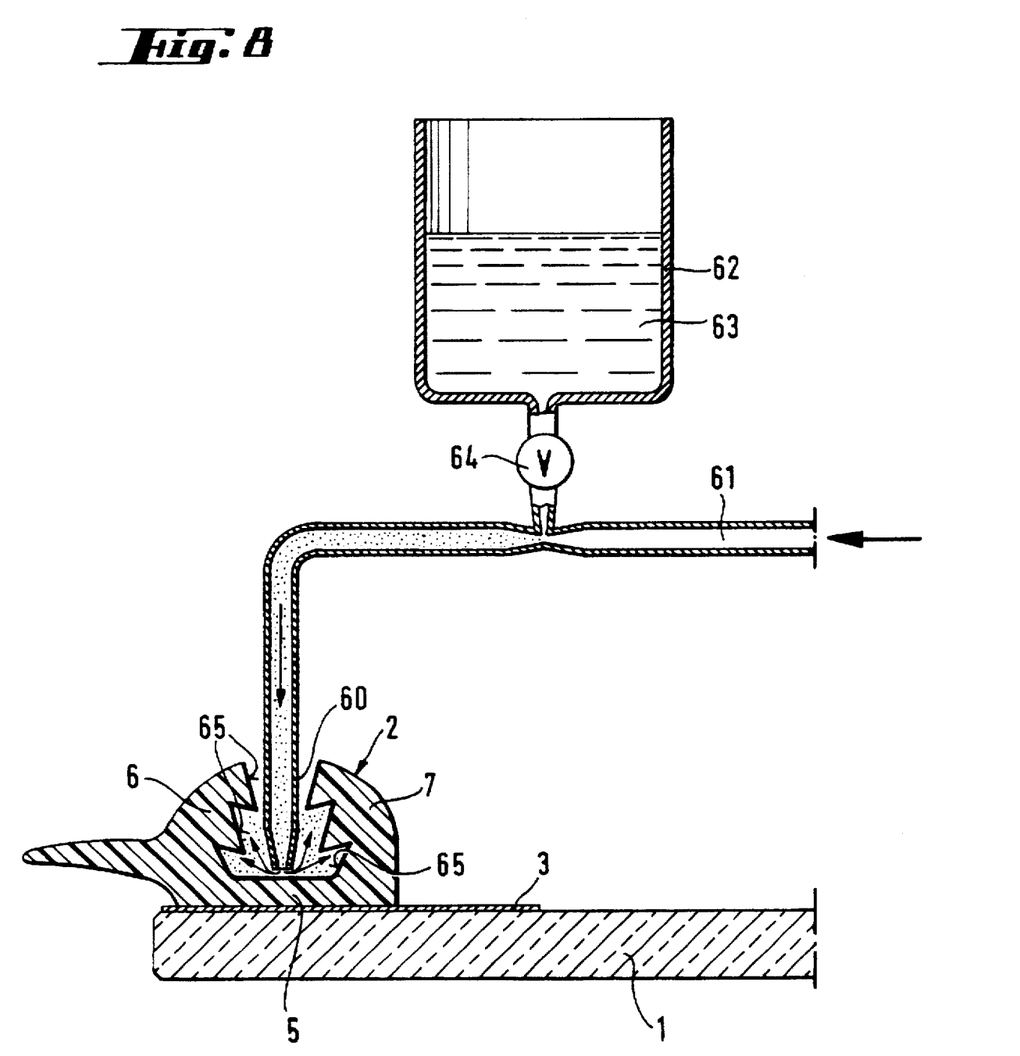
FIG. 8 is a cross-sectional view of an arrangement for the coating of the U-like mold portion with a moisture containing layer.

FIG. 8 shows one working embodiment for the performance of such a coating stage. The drawing shows a section taken through a pane 1 of glass, which in the edge part thereof possesses a frame-like layer 3 of a vitreous enamel and is provided with a frame molding 2 of graded or predetermined size produced by extrusion onto the layer 3. Also, as described above, the frame molding 2 may be produced by using injection molding and engaging the pane marginally on each side thereof. The floor portion 5 and the two lateral limbs 6 and 7 of the molding 2 constitute the U-like portion of the molding, the lateral limbs 6 and 7 being respectively provided on the inside with anchoring projections.

Directly after the production of the molding 2, while it is still at an elevated temperature of around 150° to 200° C., a suitable spray nozzle 60 is inserted into the U-like molding portion and a sprayable aqueous solution of methylcellulose is jetted in. This operation may for example be performed with the aid of a robot operated spray head, which is moved along the edge of the pane just as is done on extruding the molding 2 with the extrusion head. If desired, it is also possible for the extrusion head itself to bear such a spray nozzle so that one and the same tool may be utilized for the extrusion of the molding and furthermore the layer storing moisture.

For the coating it has for example been found convenient to employ a solution consisting of 96 parts of water and 4 parts of methylcellulose or 96 parts of water, 4 parts of methylcellulose and 1 part of cooking salt.

In the illustrated working embodiment of the invention, air is blown into the tube 61 supplying the nozzle 60. The tube 61 is connected with the outlet of a container 62, wherein a supply 63 of the aqueous methylcellulose is provided. The current of air in the tube 61 entrains the aqueous solution along with it, whose volumetric flow rate is set by means using the valve 64. The liquid mist emerging via the valve 60 comes down in the form of a coherent coating 65 on the inner surface of the U-like portion of the molding 2. Since the molding has a relatively high temperature directly following extrusion, the sprayed on film dries comparatively quickly. The dried methylcellulose does however take up moisture from the surrounding air again after cooling down. This moisture stored in the layer is sufficient in order, after the introduction of the moisture curing assembly bonding material into the molding portion, to ensure a rapid cure or one bonding material.

As has been described in detail above, it is possible for the frame-like molding to be manufactured with the U-like portion provided for receiving the bonding material composition also by injection molding in a multi-part mold. In order to be able to remove the pane from the mold after the injection molding operation, it is however necessary for certain design measures to be adopted as regards the injection mold, something entailing additional costs. On the other hand however with the aid of injection molding methods frame structures may be produced, which completely surround the pane at the margin and along the periphery of the pane have variations in cross sections, this not being possible with extrusion methods.

As a further development of the invention a method is therefore proposed for the production of a pane in accordance with the invention, which takes advantage of injection molding methods without however entailing the demolding problems noted.

This method is such that an outer part, which encircles the pane at the edge of the frame structure is produced by injection molding in a two-part mold; and after demolding of the pane, adjacent to this part of the frame structure, the part which has the U-like molding portion of the frame structure is applied by extrusion, with the aid of a robot mounted extrusion nozzle, on the pane.

The production of the frame structure is hence performed in two stages in this case. In the first stage, a frame or frame part is molded, in a familiar fashion, using injection molding and a conventional injection mold, on the pane. Following this and after demolding of the pane, a molding strand with a U-like cross section and with the inner anchoring projections is applied by extrusion in a second method stage. This second method stage may in this respect be performed directly after the first method stage in such a manner that the extruded molding strand is extruded onto the glass pane as long as the same is at an elevated temperature due to the preceding extrusion.

Figure 9:
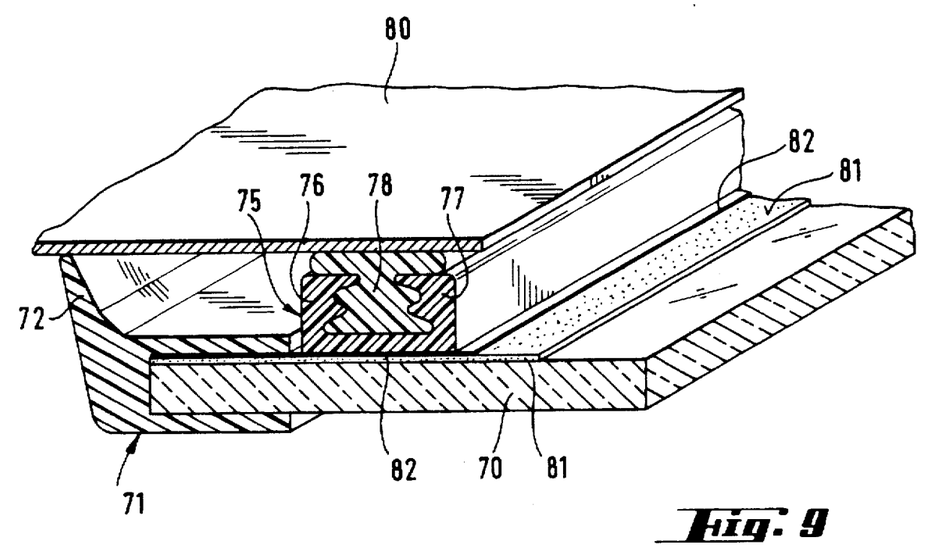
FIG. 9 is a cross-sectional view of a pane of glass, which is furnished with an injection molded encircling frame and additionally with a molding applied by extrusion in accordance with the invention.

FIG. 9 shows a glass pane 70 with a frame structure in the fitted state. The frame structure consists of an outer frame 71 overlapping the edge of the pane 70 and a molding strand 75, arranged in the interior of such frame 71 adjacent to the latter, with a U-like cross section. Along its outer periphery the frame 71 possesses a limb 72 directed towards an attachment flange 80 of the window frame. The frame 71 has been molded the edge of the pane 70 using an injection molding method. The molding strand 75 has been extruded onto the pane by extrusion using an extrusion nozzle of graded size. The two limbs 76 and 77 of the molding strand 75 are respectively on the inner side with anchoring projections, which are made by having undercuts and the cross section of the channel defined by the two limbs 76 and 77 becoming wider in a downward direction. This channel is filled with the bonding material composition 78, with which the pane 70, which has the frame structure, is bonded to the attachment flange 80. The molding strand 75, on the one hand, and the bonding material composition 78, on the other hand, consist of the materials mentioned above, which do not react with one another. The connection between the molding strand 75 and the bonding material composition 78 is exclusively ensured by the interlocking mechanical anchoring effect.

For the production of the frame structure as illustrated the operation is as follows: The pane 70, in a familiar manner, is provided with a decorative layer 81 of an opaque vitreous coloring material on the side which is later turned to face the attachment flange of the window frame. The pane is firstly provided with a suitable adhesion priming layer 82 on that part on which the frame structure is to be applied. It is convenient to use for this purpose an adhesion primer which is suitable both for the polymer to be molded using the injection method and also for the elastomer to be extruded using the extrusion method. For this purpose the adhesion priming system described above have been found to be suitable.

Next, the pane prepared in the above described manner is arranged in the lower half of a two-part injection mold which is closed by the upward mold half. The cavity of the mold is then filled with a thermoplastic polymer heated to the injection molding temperature. The pane then assumes a temperature of approximately 80° C. After solidification of the polymer the injection mold is opened by lifting upper mold half. The pane provided with the frame 71 in this manner is removed from the lower mold and placed on a processing table 13 adjacent to the injection molding device. As soon as the pane is positioned on the processing table, the molding strand 75 is deposited using a heated extrusion nozzle.

We claim:

1. In a glass pane adapted for bonding to the attachment flange of a window opening, and more especially an automobile glass pane, said glass pane comprising a frame-shape polymer molding arranged along an edge part of the pane and having a portion directed towards the attachment flange, said portion having a U-shape cross section with lateral limbs defining a cavity with an internal wall surface having anchoring projections for an adhesive bead, and an adhesive bead of cured bonding material disposed in said cavity of said portion of U-shape cross section, the improvement wherein:

a) the frame-shape polymer molding comprises a thermoplastic polyolefin elastomer of isotactic polyproplyene and ethylene-propylene-diene rubber; and    b) the bonding material comprises a moisture curing single component polyurethane system which does not enter into any adhesive bond with said polymer molding, so as to provide a connection between the polymer molding and the bonding material when cured which is solely mechanical.

2. The glass pane as claimed in claim 1, wherein the cavity of the portion of the U-shape cross-section of the frame-shape polymer molding has a christmas tree-shape cross section.

3. The glass pane as claimed in claim 1, wherein the internal wall surface of the cavity of the U-shape portion of the frame-shape polymer molding is provided at least partly with a coating containing at least one of moisture or hydroxy ions, and the bonding material of said adhesive bead is disposed in said cavity and in contact with said coating.

4. The glass pane as claimed in claim 3, wherein the coating is chosen from the group consisting of a high molecular weight carbohydrate and a polyvinylalcohol.

5. The glass pane as claimed in claim 3, wherein the coating comprises methylcellulose.

6. The glass pane as claimed in any one of claims 3 to 5, wherein the coating additionally comprises a hydrophilic or hygroscopic salt.

\* \* \* \* \*